March 18, 1924.
B. W. ST. CLAIR ET AL
ALTERNATING CURRENT POTENTIOMETER
Filed Oct. 18, 1922
1,487,615
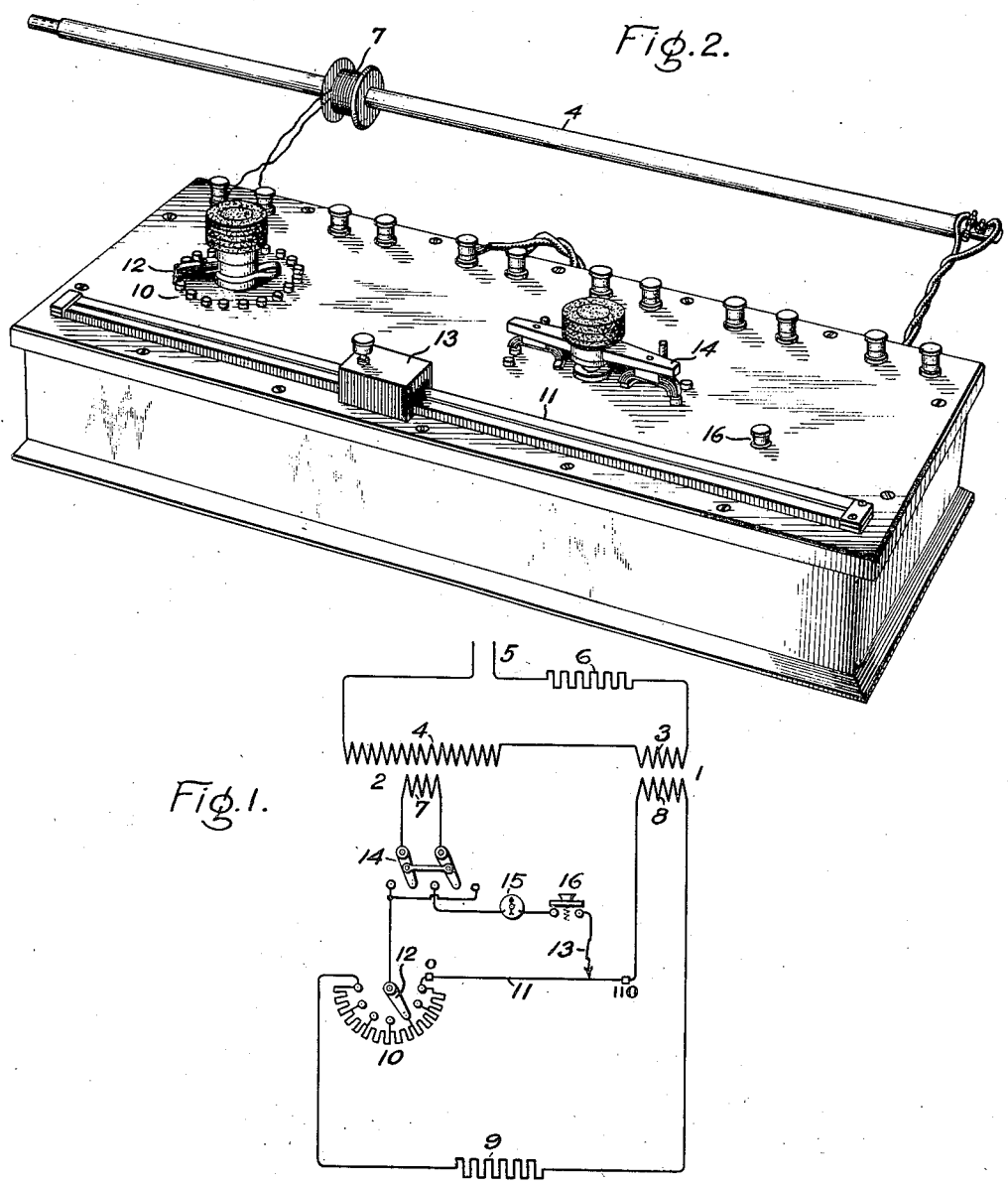
Inventors:
Byron W. St. Clair,
Stephen C. Hoare,
by Alexander S. _____
Their Attorney.

Patented Mar. 18, 1924.

1,487,615

UNITED STATES PATENT OFFICE.

BYRON W. ST. CLAIR AND STEPHEN C. HOARE, OF LYNN, MASSACHUSETTS, ASSIGNORS TO GENERAL ELECTRIC COMPANY, A CORPORATION OF NEW YORK.

ALTERNATING-CURRENT POTENTIOMETER.

Application filed October 18, 1922. Serial No. 595,359.

*To all whom it may concern:*

Be it known that we, BYRON W. ST. CLAIR and STEPHEN C. HOARE, citizens of the United States, residing at Lynn, in the county of Essex, State of Massachusetts, have invented certain new and useful Improvements in Alternating-Current Potentiometers, of which the following is a specification.

Our invention relates to alternating current potentiometers and in particular to an alternating current potentiometer for measuring the number of turns in a coiled wire.

The usual method of measuring the number of turns in a coil with the aid of the ballistic galvanometer, though very accurate, is much too slow and laborious for general shop practice. This method consists simply in threading the coil under test, together with a standard coil, over the middle section of a long air core solenoid which acts as a primary coil. This arrangement may be used in two different ways. First, a null method where the unknown and standard coils are connected in series opposition and the standard is adjusted so that upon suddenly reversing the current in the solenoid no galvanometer deflection is noted; and second, a comparative method where the deflections of the galvanometer, when connected to each coil separately, through suitable series resistance, are noted. Both methods require much care and patience and are therefore wholly unsuited for uses outside of a laboratory. The present day construction of various types of electrical apparatus demand devices for quickly and accurately checking the finished coils in the factory inspection department and it is the primary object of our invention to provide an improved portable instrument for quickly and accurately determining the number of turns in a coil of wire. A further object of our invention is to provide an alternating current potentiometer, the accuracy of which is not affected by variations in voltage, primary current, wave forms or ordinary variations in the frequency of the measuring source. A further object is the provision of such an instrument capable of use without change over a wide range in the resistance and number of turns of the coils to be measured. Other advantages of the improved coil measuring device will appear as the description proceeds.

The features of our invention which we believe to be novel and patentable will be pointed out in the claims appended hereto. The construction, calibration and use of an alternating current potentiometer built in accordance with our invention will now be explained in connection with the accompanying drawings in which Fig. 1 diagrammatically represents the electrical connections of the instrument, and Fig. 2 shows a perspective view of the portable potentiometer.

Referring to the drawings and more in particular to Fig. 1, it will be seen that the instrument takes the form of an alternating current potentiometer in which the voltage drop in a calibrated resistance is balanced against the induced electromotive force of the coil to be measured. An exciting transformer 1 and a testing transformer 2 have their primaries 3 and 4 connected in series to a suitable source of alternating current, for example, a 110 volt 60 cycle source 5. Preferably a resistance 6 is also included in this circuit. The transformers 1 and 2 are of the air core type. The primary 4 of the test transformer consists of a rather long multilayer solenoid best shown in Fig. 2 and is set up in a position to allow the coil 7, which constitutes the secondary of this transformer and the coil to be tested, to be easily threaded over the middle point. The exciting transformer 1 is of short length and of such design that its secondary load is inappreciable. The secondary winding 8 of the exciting transformer is connected in series with a resistance 9, which when once adjusted to calibrate the potentiometer, remains fixed in value, a resistance 10 forming a rheostat and a slide wire resistance 11. The test coil 7 is adapted to be connected between the arm 12 of rheostat 10 and a slider 13 in contact with the slide wire resistance 11 through a reversing switch 14, an alternating current indicating instrument 15 and a key 16. The indicating instrument 15 may be any sensitive alternating current instrument or detector, such, for example, as an alternating current galvanometer.

The complete device with the exception of the test transformer and the indicating instrument is preferably contained in a portable case such as is shown in Fig. 2. In this figure the radial switch at the left constitutes the exposed portion of the rheostat 10 and adjustable contact arm 12. The coil reversing switch 14 is shown near the center, the detector key 16 at the right and the slide wire rheostat on the front of the cover. The test transformer primary 4 with an unknown coil 7 in position to be tested is shown at the back of the case. The necessary terminals for connecting up the instrument are shown on the back cover of the case.

The instrument may be calibrated as follows:—First, each section of the rheostat 10 is closely adjusted to equal 90.9 per cent of the slide wire resistance 11. There may be as many of these sections as is required to meet the range desired. The sections of the rheostat 10 are made equal to 90.9 per cent of the slide wire resistance to allow 10 per cent overlap in the slide wire. Next a coil containing a known number of turns, for example, 100 turns, is made the secondary of the test transformer and connected up as shown in the drawings. Arm 12 of rheostat 10 is adjusted so that the circuit of coil 7 contains one section of rheostat 10 and slider 13 is placed on zero; that is to say on the left hand end of wire 11 as viewed in Fig. 1. The current in the slide wire circuit is then adjusted by means of resistance 9 until the detector 15 gives no indication when the key 16 is closed. The reversing switch 14 will, of course, be closed in the proper direction to make the induced voltages from the exciting and test transformers oppose each other so that no current will flow in the detector circuit when a balanced condition is reached. After this adjustment has been made, resistance 9 may be permanently installed within the instrument case. Next, the arm 12 is set to zero, that is to say, at the right hand end of resistance 10 as viewed in Fig. 1 and the slider 13 is moved along the wire to the right until the detector again indicates a balanced condition. This point on the wire is marked 100 and the remainder of the slide wire is graduated uniformly from zero to 110 turns. Thus, each section of resistance 10 represents 100 turns and the slide wire represents 110 turns. The number of turns in any unknown coil 7 may thus be determined by connecting it up as shown and adjusting the rheostat 10 and slide wire 11 until a balanced condition is reached. The number of turns in the unknown coil will then be equal to 100 times the number of sections of rheostat 10 in circuit plus the reading of the slider 13. The taps of rheostat 10 may be marked accordingly. The rheostat 10 shown in Fig. 1 has six sections and it may therefore be used to measure the number of turns in any coil up to 710 turns. The instrument shown in Fig. 2 is represented as having 19 taps in the resistance 10 and it may therefore be used for measuring coils up to 2010 turns. It will be obvious that each section of resistance 10 may be made to represent 50, 200 or any other suitable number of turns and the slide wire graduated accordingly. The maximum range of the device depends upon the ratio of the exciting transformer.

At the same time the number of turns are measured, the polarity of the unknown coil may be determined and its terminals marked accordingly by observing the position of reversing switch 14, its position having been previously noted with a coil of known polarity. Short circuits in the coil under test show up instantly with this instrument. Other advantages of this type of instrument are that it may be used to quickly measure the number of turns of a coil wire irrespective of its size, shape or resistance provided the coil does not have an iron core and may be placed over the primary of the test transformer. The instrument is quite sensitive and possesses a long range. It also maintains the same sensitivity over this long range. Hence, one turn deviation may be detected in a thousand turn coil equally as well as in one of ten turns. Any voltage variation of the source affects the drop over the slide wire and the electromotive force in the unknown coil in the same proportion and thus the point of balance remains unchanged. Moderate changes in frequency wave form etc., also introduce no errors as they affect both sets of circuits alike.

In accordance with the provisions of the patent statutes, we have described the principle of operation of our invention, together with the apparatus which we now consider to represent the best embodiment thereof; but we desire to have it understood that the apparatus shown is only illustrative and that the invention may be carried out by other means.

What we claim as new and desire to secure by Letters Patent of the United States, is:—

1. An alternating current potentiometer for measuring coil turns comprising an exciting transformer, a test transformer, the secondary of which is the coil to be measured, means for connecting the primaries of said transformers in series to a source of alternating current, a graduated resistance in the secondary circuit of said exciting transformer and means for electrically balancing the secondary of said test transformer across a portion of said resistance, said portion being calibrated and graduated to indicate the number of turns in said test transformer secondary when a balanced condition is reached.

2. An alternating current potentiometer for measuring coil turns comprising an exciting transformer and a test transformer, both of the air core type, adapted to have their primaries connected in series to a source of alternating current, the primary of said test transformer being wound in the form of a long thin solenoid whereby its secondary which constitutes the coil to be measured may be threaded thereon, a calibrated resistance in the secondary circuit of said exciting transformer, means for electrically balancing the secondary of said test transformer across a portion of said resistance, means for indicating said balanced condition and means for indicating the number of turns in the secondary of said test transformer when said balanced condition is reached.

3. An instrument for measuring coil turns comprising a pair of air core transformers adapted to have their primaries connected in series to a source of alternating current, a calibrating resistance and a graduated resistance in the secondary circuit of one of said transformers, said graduated resistance comprising a slide wire and a multiple section resistor in series, each section of said resistor being of equal resistance and less than that of said wire, a coil to be measured constituting the secondary of said other transformer arranged to be electrically balanced across a portion of said graduated resistance when the primaries of said transformer are energized, the value of said calibrating resistance being such that the portion of the graduated resistance across which said coil is balanced is a direct indication of the numbers of turns in said coil.

In witness whereof, we have hereunto set our hands this 16th day of October, 1922.

BYRON W. ST. CLAIR.
STEPHEN C. HOARE.